United States Patent [19]
Brooks
[11] Patent Number: 4,797,837
[45] Date of Patent: Jan. 10, 1989

[54] METHOD AND APPARATUS FOR THERMAL PRINTER TEMPERATURE CONTROL

[75] Inventor: Ralf M. Brooks, Waterloo, Canada
[73] Assignee: NCR Canada Ltd. - NCR Canada LTEE, Mississauga, Canada

[21] Appl. No.: 855,271
[22] Filed: Apr. 24, 1986
[51] Int. Cl.⁴ ............ G01D 15/10
[52] U.S. Cl. ............ 364/519; 346/76 PH; 219/216; 364/557
[58] Field of Search ............ 364/550, 551, 557, 571, 364/519; 346/76 PH; 219/216

[56] References Cited

U.S. PATENT DOCUMENTS

| | | | |
|---|---|---|---|
| 3,409,902 | 11/1968 | Merryman | 346/76 |
| 3,577,137 | 5/1971 | Brennan, Jr. | 340/324 |
| 4,113,391 | 9/1978 | Minowa | 400/120 |
| 4,262,188 | 4/1981 | Beach | 219/216 |
| 4,284,876 | 8/1981 | Ishibashi et al. | 219/216 |
| 4,305,080 | 12/1981 | Cunningham et al. | 346/76 PH |
| 4,330,786 | 5/1982 | Hatabe et al. | 346/76 PH |
| 4,347,518 | 8/1982 | Williams et al. | 346/1.1 |
| 4,386,360 | 5/1983 | Murayama et al. | 346/76 PH |
| 4,391,535 | 7/1983 | Palmer | 400/120 |
| 4,449,033 | 5/1984 | McClure et al. | 219/216 |
| 4,496,824 | 1/1985 | Kawai et al. | 219/216 PH |
| 4,502,056 | 2/1985 | Matsuda | 219/216 PH X |
| 4,540,295 | 9/1985 | Okunishi et al. | 400/120 |
| 4,542,281 | 9/1985 | Thompson | 219/216 |
| 4,574,293 | 3/1986 | Inui et al. | 346/76 PH |
| 4,579,469 | 4/1986 | Falcetti | 400/124 |
| 4,587,530 | 5/1986 | Noguchi | 219/216 PH X |

OTHER PUBLICATIONS

Article entitled "High Speed Thermal Printing Head and Its Temperature Control", by Mamoru Mizuguchi et al. of Toshiba Corp., in "Advances In Non-Impact Printing Technologies For Computer & Office Applications", Edited by J. Gaynon for Van Nostrand Reimhold Co.—pp. 857–873.

Article entitled "High-Speed Thermal Recording", by Katsuhisa Saito, Kazuo Nakano, Keiji Murasugi and Toshiyuki Iwabuchi of OKI Electric Industry Co., Ltd.—Research Laboratory, Tokyo, Japan—Proceedings of the SID, vol. 21/2, 1980, pp. 165–169.

Article entitled "Theory of Thermoelectric Heat Pumps", by Marlow Industries, Inc., Garland, Tex.—p.1.

*Primary Examiner*—Gary V. Harkcom
*Assistant Examiner*—H. R. Herndon
*Attorney, Agent, or Firm*—Wilbert Hawk, Jr.; Albert L. Sessler, Jr.

[57] ABSTRACT

Method and apparatus for control of the temperature of a thermal printing device. Thermoelectric heat pumps are used to cool a thermal print head which does not cool between cycles sufficiently below the threshold temperature for the thermal paper or thermal transfer ribbon being used, due to heat build-up, particularly during high-speed operation. A sensed thermal print head temperature is digitized and compared to a reference temperature for a determination of whether or not operation of the heat pumps should be initiated or halted.

22 Claims, 6 Drawing Sheets

METHOD AND APPARATUS FOR THERMAL PRINTER TEMPERATURE CONTROL

BACKGROUND OF THE INVENTION

Thermal printers have found widespread use in a number of applications because of their advantages, which include non-impact operation and very low noise level. The utility of thermal printers generally has been somewhat limited, however, due to relatively low operating speed. In large part, this is caused by thermal inertia; that is, when the individual thermal elements of a thermal printer, such as one of the dot matrix type, for example, are heated to the temperature necessary to produce the desired recording on the record medium on which printing is to be effected, a time interval for cooling is necessary before the thermal printer matrix can be used for the next operation; otherwise spurious recording will result from elements which have not cooled below a critical temperature. Particularly during high speed printing, peak temperatures of the print elements become higher and higher as time passes when sufficient cooling time is not allowed between burns. After a short time in such a situation, the temperature values reached at the end of the cool period could be above the threshold temperature of the thermal paper or thermal transfer ribbon being used with the printer.

A partial solution has been found in the past to this temperature build-up problem by reducing the time duration of the current pulses which are applied to the thermal elements or by reducing the magnitude of the applied current. However there comes a point, as the burn time duration approaches zero or as the initial temperature of the element approaches the threshold temperatures, that further control is no longer feasible. In a line printer application, for example, the thermal print head can be driven at the highest speeds only when all elements are driven simultaneously. The large energy build-up as such a printer cycles will cause a rapid decrease in operating speed, due to the necessity to pause between cycles until the element temperatures cool below the threshold values. It should also be noted that other heat generating sources are usually present in a thermal printer environment, such as stepper motors, for example. These speed constraints become more extreme as the size of the printer is increased, of course.

SUMMARY OF THE INVENTION

This invention relates to a closed-loop method and apparatus for controlling the unwanted temperature build-up which can occur during the operation of thermal elements, particularly as operating speed is increased, and more particularly to such closed-loop method and apparatus in which a thermoelectric heat pump is employed. This closed-loop control of the thermoelectric heat pump allows the dissipation of the unwanted heat build-up and thus enables a high speed printing capability.

In accordance with a first embodiment of the invention, a method of controlling the temperature of a thermal print head which includes a heat sink and which comprises part of a printer comprises the steps of insulating the heat sink of the thermal print head from the rest of the printer; determining a maximum reference temperature at which the thermal print head can operate without erroneous printing; measuring the temperature of the thermal printing device during operation; and cooling the heat sink of the thermal print head whenever the temperature of said print head rises above said maximum reference temperature.

In accordance with a second embodiment of the invention, thermal printing apparatus comprises, in combination, thermal print head means including a ceramic layer and a plurality of resistive elements thereon, and capable, when heated to a sufficient degree, of producing markings on a record member a heat sink in contact with said thermal print head means; a thermal print head frame located in proximity to said heat sink; sensing means located in said heat sink for measuring the temperature of the thermal print head means; cooling means positioned in an aperture in said thermal print head frame in contact with said heat sink and capable of cooling said thermal print head means; means for periodically comparing the temperature of the sensing means with a reference temperature; and means for operating said cooling means when the measured temperature exceeds the reference temperature, and for terminating the operation of said cooling means when the measured temperature is reduced to the reference temperature or below.

It is accordingly an object of the present invention to provide a method for controlling unwanted temperature build-up in a thermal printing apparatus.

Another object is to provide a method for controlling unwanted temperature build-up in a thermal printing apparatus by use of at least one thermoelectric heat pump.

Another object is to provide a method for controlling unwanted temperature build-up to provide high-speed printing capability.

Another object is to provide a thermal printing apparatus capable of controlling unwanted temperature build-up.

Another object is to provide a thermal printing apparatus capable of controlling unwanted temperature build-up by use of at least one thermoelectric heat pump.

With these and other objects, which will become apparent from the following description, in view, the invention includes certain novel features of construction and combinations of parts, a preferred form or embodiment of which is hereinafter described with reference to the drawings which accompany and form a part of this specification.

DESCRIPTION OF THE PREFERRED EMBODIMENT

In the present invention, a closed-loop technique is employed for controlling the unwanted temperature build-up which can occur during the course of high-speed thermal printing in the operation of a plurality of thermal printhead elements. This closed loop control is achieved by attaching a thermoelectric heat pump directly to the heat sink of a thermal print head and controllably modulating the base temperature of the heat sink to allow rapid dissipation of any temperature build-up within the thermal print head due to high-speed operation.

Figure 1:
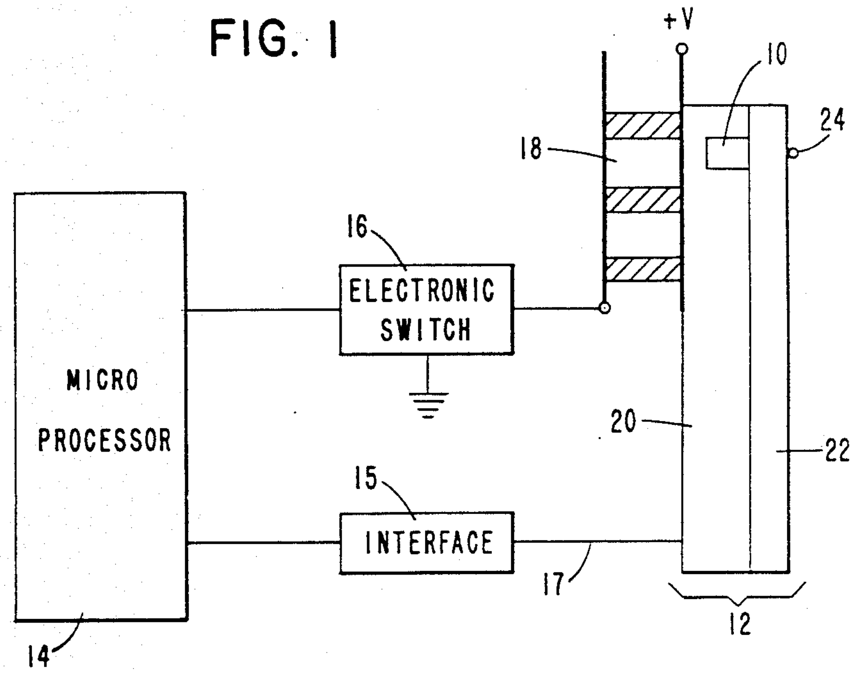
FIG. 1 is a block diagram showing the basic components which comprise the system of the present invention.

Referring now to the drawings, shown in FIG. 1 is a block diagram illustrating the various components which comprise the closed loop system. A thermal print head structure 12 comprising a ceramic substrate 22 and a metal heat sink 20 is operated through a suitable interface circuit 15 shown in FIG. 1 as connecting a plurality of interconnecting lines 17 comprising power, ground, serial data line, clock, latch, and thermistor temperature sensor lines extending between the printhead 12 and the control microprocessor 14. The printhead elements 24 are shown in end view and will customarily be controlled by a plurality of on board transistors, one for each individual thermal print head element, which are in turn operated under control of a data processing system and suitable data storage devices such as registers and flip flops. A temperature sensor 10 embedded in the thermal print head structure 12 flush with the ceramic substrate 22 indicates to a control microprocessor 14 the present temperature of the thermal print head structure 12. If this temperature exceeds a predetermined limit specified in a read-only memory of the microprocessor 14, the microprocessor sends an "on" command to an electronic switch 16, which activates a thermoelectric heat pump 18. The thermoelectric heat pump then remains on, cooling the thermal print head structure 12, until the temperature sensed by the sensor 10 drops below the value which is preset in the read-only memory of the microprocessor 14, whereupon the microprocessor sends an "off" command to the electronic switch 16, which in turn causes the thermoelectric heat pump 18 to cease operation.

Since the thermoelectric heat pump constitutes an important aspect of the present invention, a further description of this device is believed to be in order. Thermoelectric heat pumps are solid-state devices with no moving parts. With a suitable electrical power input, they pump heat from one side of the device to the other. Available in a variety of shapes and sizes, including some sufficiently small to fit on an integrated circuit chip, they provide a means for cooling objects well below ambient temperatures.

Thermoelectric heat pumps operate upon the principle of the Peltier effect. Briefly stated, this is that the passage of an electrical current through the junction of two dissimilar conductors can either cool or heat the junction, depending upon the direction of the current. Heat generation or absorption rates are proportional to the magnitude of the current and are dependent upon the temperature of the junction.

At open circuit, the thermoelectric module acts like a simple thermocouple. A temperature gradient maintained across the device creates a potential across its terminals which is proportional to the temperature differential. If the temperature differential is maintained, and if the device is connected to an electrical load, power is generated. If, instead, the device is connected to a DC source, heat will be absorbed at one end of the thermoelectric module, cooling it, while heat is rejected at the other end, where the temperature increases. Reversing the current flow reverses the flow of heat, so that the module can generate electrical power, or, depending upon how it is connected to external circuitry, heat or cool an object. One manufacturer of thermoelectric heat pumps is Marlow Industries, of Garland, Tex.

In determining the choice of a thermoelectric heat pump, the two key variables which must be known are, first, the quantity of heat which will be generated by the active thermal print head heat source, and, second, the maximum temperature difference which will exist between the cooled thermal print head and the ambient environment. For the illustrated embodiment of the invention, it will be assumed that the thermal print head employed includes 320 electro-resistive elements, of which no more than 196 elements may operate simultaneously at any one time; for which the power dissipation is 0.85 watts per element; and for which the useful power transmission efficiency is 90%. A ten percent total internal power consumption of approximately 16.7 watts would thus be expected. Let it be assumed that the thermal print head heat sink will be maintained at 30 degrees C and that the thermal print head carrier frame design will be maintained at 50 degrees C, which is considered to be 10 degrees C above an ambient temperature of 40 degrees, which is typical of the temperature found in the confined quarters of some printer modules. Therefore the thermoelectric heat pump must pump heat from the thermal printhead heat sink to the thermal printhead carrier frame.

Figure 2:
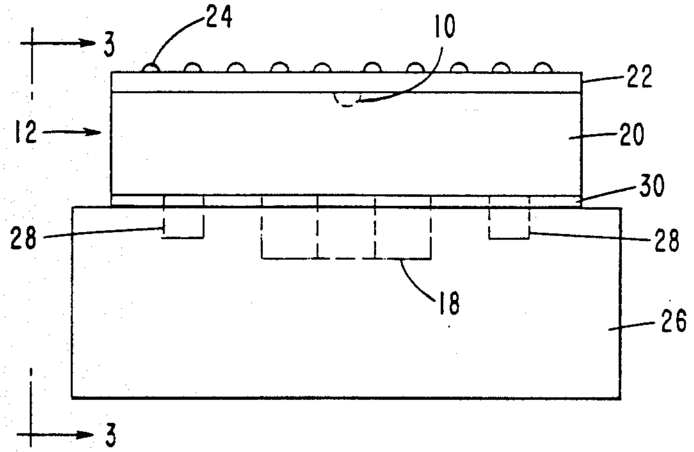
FIG. 2 is a plan view of a thermal print head embodying a thermoelectric heat pump.
Figure 3:
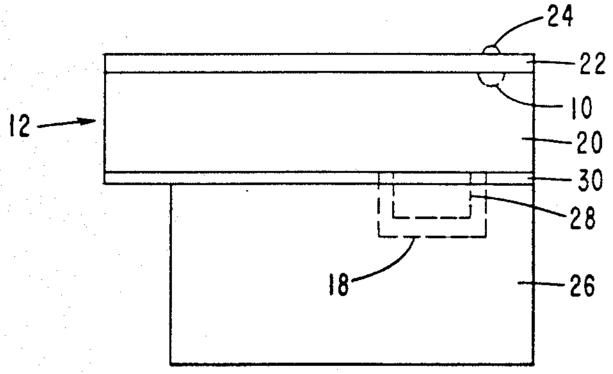
FIG. 3 is an elevation view of the thermal print head, taken along line 3—3 of FIG. 2.

Referring now to FIGS. 2 and 3, the thermal printhead 12 shown there includes a heat sink 20 of suitable material, such as aluminum; a ceramic layer 22 containing a line of resistive elements 24, and a temperature sensor 10. The thermal printhead 12 is secured to a thermal printhead carrier frame 26 by suitable fastening means such as projections 28 which extend from the heat sink 20 and are engaged in apertures in the frame 26.

A further aperture is provided in the carrier frame 26 to receive one or more thermoelectric heat pumps 18. The heat pump 18 may be attached directly to the back of the heat sink 20 in any suitable manner. It may, for example, be pressure clamped between the heat sink 20 and the frame 26, in which case the flatness of the heat sink 20 should be better than plus or minus 0.001 inch. Alternatively, the heat pump 18 may be epoxied or soldered to the back of the heat sink 20. In the preferred embodiment illustrated in FIGS. 2 and 3, a thin sheet of insulation 30, such as polyurethane, separates the thermal print head heat sink 20 from the frame 26 in order to minimize the leakage of heat from the warmer carrier frame 26 to the cooler heat sink 20.

Heat leakage increases proportionately with a cooled object's surface area and decreases proportionately as the thickness of isolating insulation increases. The overall rate of change of heat leakage is also dependent upon the temperature differential between the cold and hot surfaces. Therefore in determining the total heat load which a thermoelectric heat pump must transport, not only the active heat source of the thermal print head elements must be considered, but also the heat leakage associated with a specific mechanical configuration.

As previously noted, a total active heat load $Q_C$ of 16.7 watts for the illustrated embodiment is expected. In addition, a heat leakage of approximately 3.3 watts is estimated, producing a total heat load $Q_{CH}$ of 20 watts.

Using the previously assumed temperature differential of 20 degrees C, it is now required to determine the thermoelectric heat pump's operating current and voltage, the number of thermoelectric heat pumps needed, and the amount of heat rejected, $Q_H$, which is the arithmetic sum of the transported heat load $Q_{CH}$ and the input electrical power dissipated in the heat pump.

Figure 4:
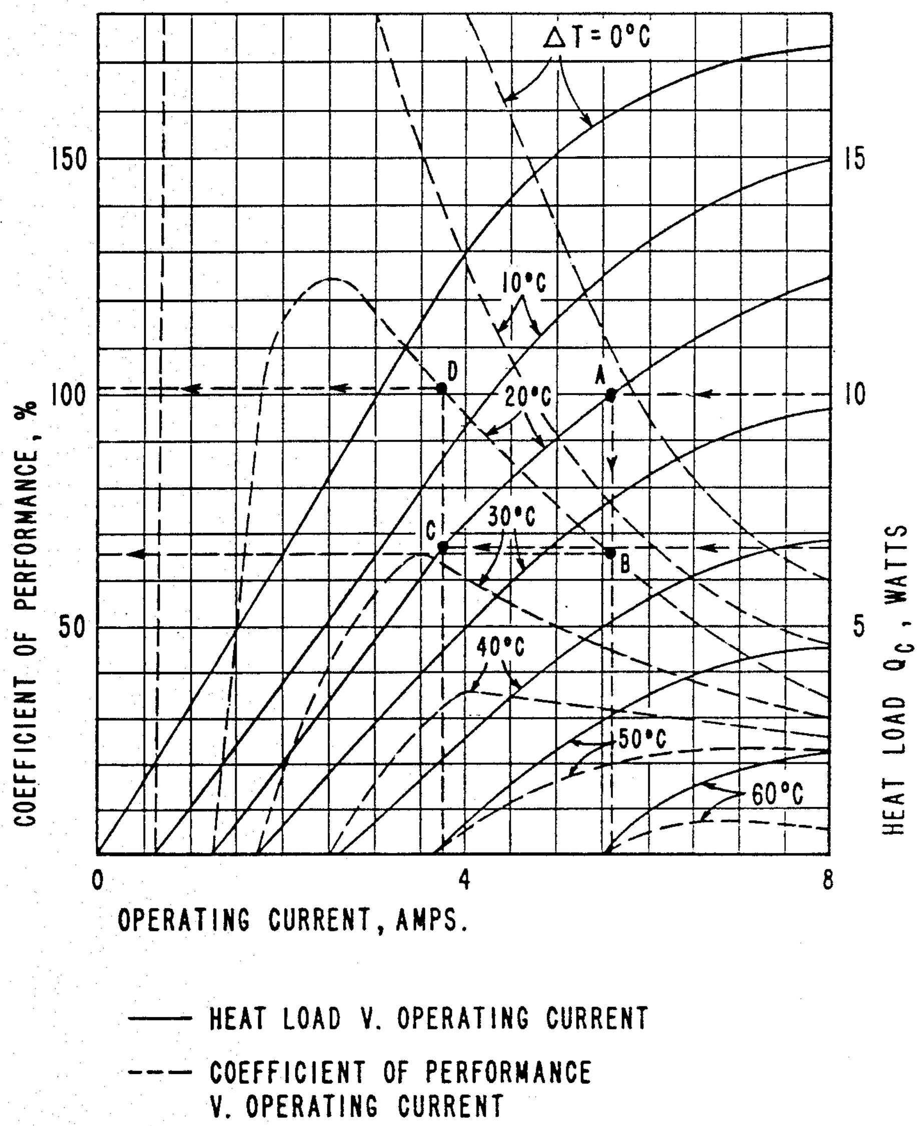
FIG. 4 represents a performance chart for a commercially available thermoelectric heat pump.

FIG. 4 illustrates a typical performance chart for a commercially available thermoelectric heat pump. This chart shows the relationship between the heat absorbed at the cold side, $Q_C$, versus operating current. The chart also shows the thermoelectric heat pump's coefficient of performance, COP, versus operating current. The running variable is the difference in temperature between the hot and cold sides. Note that COP is defined as the ratio of $Q_{CH}$ to electrical power in, and can therefore be greater than 100 percent, since the electrical power is used primarily to transport heat.

For the preferred embodiment in which $Q_{CH}$ equals 20 watts, and in which the temperature differential equals 20 degrees C, it is noted that a single thermoelectric heat pump could not handle the entire load, since the maximum heat load transportable by this heat pump at a temperature differential of 20 degrees C is approximately 20 watts. Accordingly, more than one thermoelectric heat pump is required to transport the heat load $Q_C$. Space constraints in the illustrated embodiments of the thermal print head allow no more than three heat pumps 18 to reside at the rear of the thermal print head 12.

Considering first the case in which two heat pumps are used, each pump 18 must pump at least half of ($Q_C$+HEAT LEAK) equals $Q_{CT}$. $Q_C$ equals $Q_{CT}/2$, equals 20/2, equals 10 watts. Based upon the $Q_C$ of 10 watts and a temperature differential of 20 degrees C, a 5.6 ampere operation of each pump is predicted, and the coefficient of performance is found to be 65 percent. Then the total electrical power consumed by the two pumps is P equals ($Q_C$/COP) N, equals (10/0.65)2, equals 30.77 watts. With the two modules connected electrically in series, V equals P/I, equals 30.77/5.6, equals 5.5 volts. The total heat rejection is QH equals ($Q_C \times N$)+P, equals $10 \times 2 + 30.77$, equals 50.77 watts. Required thermal resistance of the heat sink equals (TH−TA)/QH, equals (50−40)/50.77, equals 0.197 degrees C per watt.

Considering the case in which three heat pumps are used, $Q_C$ equals $Q_{CT}/3$, equals 20/3, equals 6.67 watts. From FIG. 4, I equals 3.75 amps; also from FIG. 4, COP equals 101 percent. P equals (6.67/1.01)3, equals 19.8 watts. V equals 19.8/3.75 equals 5.3 volts. QH equals $6.67 \times 3 + 19.8$, equals 39.8 watts. Required thermal resistance of the heat sink equals (50−40)/39.8, equals 0.251 degrees C per watt. It will thus be seen that the advantage in utilizing a third heat pump is a reduction in operating curent by 1.85 amperes and a 10 watt drop in dissipated power. Requirements for the thermoelectric heat pump are thus for a 5.3 volt source capable of providing 3.75 amperes of current.

In a simplified design for the system, the ambient temperature is not measured. Instead, a worst case temperature differential of 20 degrees C is assigned. The thermoelectric heat pumps 18 are simply turned on until the temperature monitored internally in the thermal print head 12 drops below a predetermined value.

An understanding of the manner in which a thermoelectric heat pump can control the reference temperature of a thermal print head is facilitated by the development of a model in which the thermal print head physical structure is represented by electrical circuit components.

Figure 5:
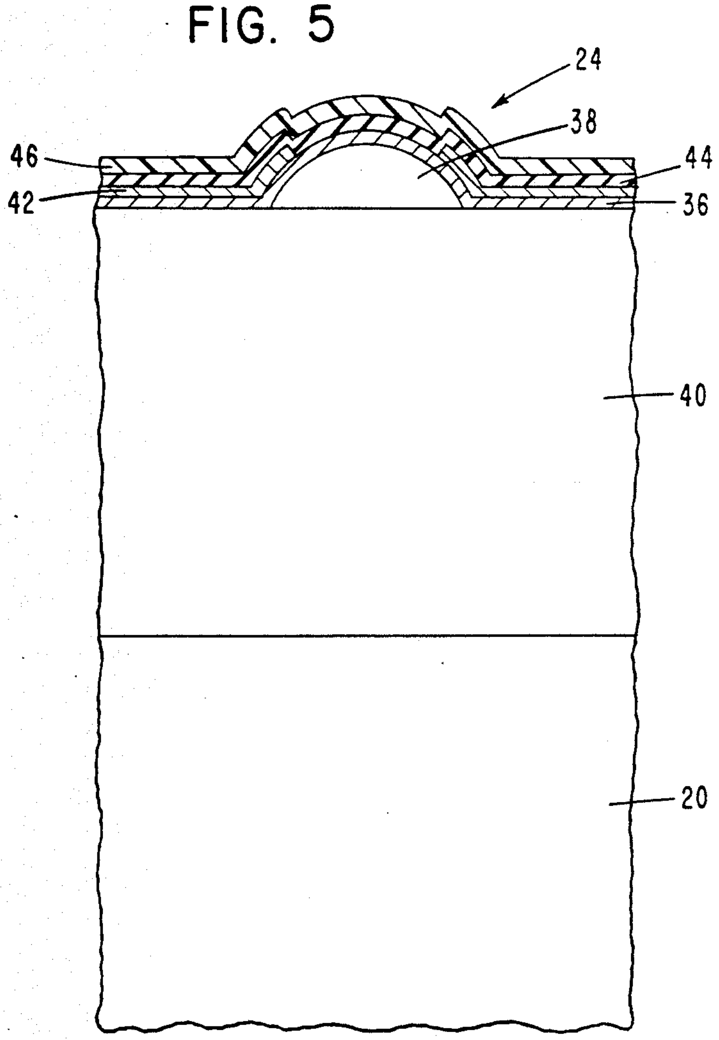
FIG. 5 is a cross-sectional view of a thermal printhead element.

FIG. 5 is a cross-sectional view of a typical thermal print head element 24. A thermal printhead electroresistive element 36, which may be fabricated from $Ta_2N$, is positioned above a hemispherical raised partially glazed portion 38, which may be of glass, of a substrate 40, which may be of 96 percent $Al_2O_3$. The substrate 40 in turn is bonded to the heat sink 20, which may be of aluminum. An aluminum electrode lead 42 is bonded to the element 36, and a first protective layer 44 of $SiO_2$ is placed thereover, with a second protective layer 46 of $Ta_2O_5$ being placed over the layer 44. Each electroresistive element 24 of the thermal printhead 12 has an area which is substantially equal to, or a sub-multiple of, the desired incremental area of each character segment to be printed.

Figure 6:
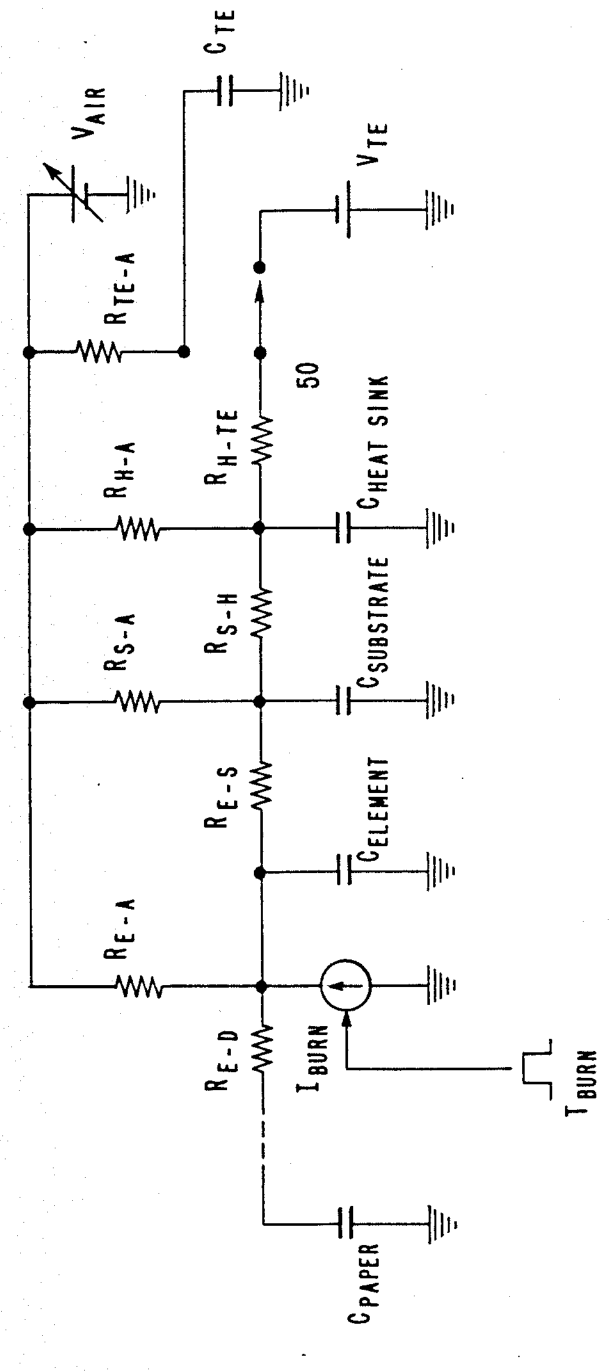
FIG. 6 is a diagram of an electrical circuit analog representation of the thermal printhead physical structure.

The element area referred to above therefore has a certain thermal mass which may be modelled in the analog circuit representation of FIG. 6 as an electrical circuit capacitor designated as $C_{ELEMENT}$. The constant electrical current which is passed through the element 24 for the duration of the burn period is modelled in FIG. 6 as a current source $I_{BURN}$. The heat pulse generated by the current source is transmitted to the receiving document and/or thermal transfer ribbon and lost to some extent to the surrounding air, and is also conducted through the thermal resistance separating the element 24 and the substrate 40 through to the thermal mass of the substrate 40. The boundary between the thermal element mass and the outside air is represented in FIG. 6 as electrical resistor $R_{E\text{-}A}$, E-A representing element to air. The boundary between the thermal element mass and the document is represented in FIG. 6 as electrical resistor $R_{E\text{-}D}$, E-D representing element to document. The boundary between the thermal element mass and the substrate is represented in FIG. 6 as electrical resistor $R_{E\text{-}S}$, the E-S representing element to substrate. The thermal mass of the glaze substrate 40 is modelled by a capacitor $C_{SUBSTRATE}$.

The heat which is conducted through to the glaze substrate 40 is further conducted through the thermal resistance between the substrate 40 and the heat sink 20, and lost to the surrounding air. The thermal resistance between the substrate 40 and the heat sink 20 is modelled by an electrical resistor $R_{S\text{-}H}$, the S-H representing substrate to heatsink. The boundary between the substrate and the surrounding air is represented in FIG. 6 as electrical resistor $R_{S\text{-}A}$, the S-A representing substrate to air. The thermal mass of the heat sink 20 is represented in FIG. 6 by a capacitor $C_{HEATSINK}$. The heat sink 20 will radiate some of its absorbed heat to the surrounding air, as modelled by the electrical resistor $R_{H\text{-}A}$, the H-A representing heat sink to air. The heat sink 20 will also conduct some of its absorbed heat to the surrounding frame structure, as modelled by the electrical resistor $R_{H\text{-}F}$, the H-F representing heat sink to frame.

The surrounding air temperature is modelled in FIG. 6 by a varying voltage source $V_{AIR}$. The heat sink 20 will either be connected to a passive (turned off) thermoelectric heat pump 18 which is modelled by a capacitor $C_{TE}$ and a resistor $R_{TE\text{-}A}$ (referring to heat pump to air) or will be connected to an active (turned on) thermoelectric heat pump 18 modelled by a reverse polarity battery $V_{TE}$ and a resistor $R_{H\text{-}TE}$ (referring to heat sink to heat pump). A two-position switch 50 in FIG. 6 represents the capability of selection, in inclusion of the battery $V_{TE}$ representing an active heat pump 18.

The thermal mass of the receiving thermal paper or thermal transfer ribbon is represented in FIG. 6 by a capacitor $C_{PAPER}$. The objective, in terms of the representation of FIG. 6, is to produce sufficient charge (heat) to exceed the threshold voltage $V_{THRESHOLD}$, representing the transfer or print temperature.

It will be seen from physical considerations that:

$C_{ELEMENT} << C_{PAPER} << C_{SUBSTRATE} < C_{HEATSINK}$

It will also be seen that:

$R_{E\text{-}A}$ is approximately equal to $R_{S\text{-}A}$ is approximately equal to $R_{H\text{-}A}$, and that:

$R_{E\text{-}D} << R_{S\text{-}H} < R_{H\text{-}F} < R_{E\text{-}S} < R_{E\text{-}A}$.

The absolute values of the above parameters will be process and mechanism independent.

The discharge or cooling time (that is, the time taken to return to ambient temperature conditions) is generally longer than the burn time. Reference to the diagram of FIG. 6 will show that the capacitor $C_{ELEMENT}$ is charged directly by the external current source $I_{BURN}$, whereas once $I_{BURN}$ is removed during the COOL period, $C_{ELEMENT}$ must discharge through the effective impedance of the entire system, which, of course, has a much longer time constant.

Figure 8:
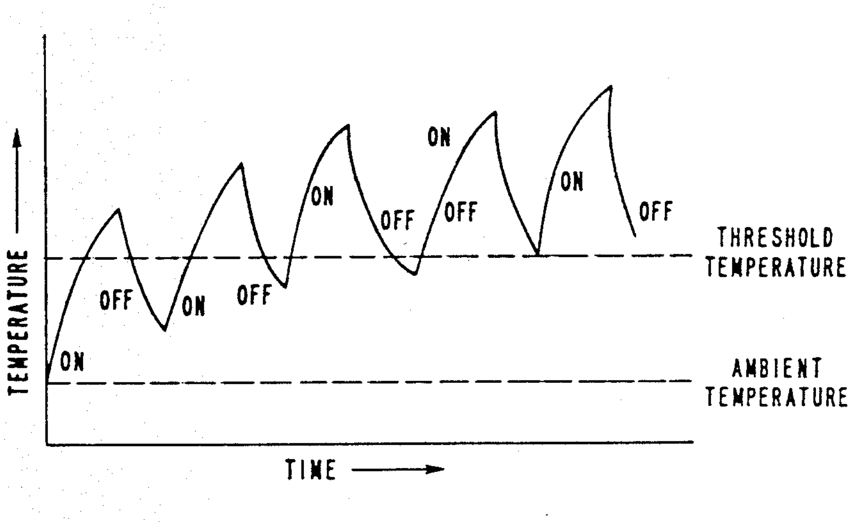
FIG. 8 is a diagram illustrating the effect of temperature build-up during high speed printing when an element is not given sufficient time to cool.

An important aspect to be remembered in considering the modelled analog circuit representation of FIG. 6 is that although a more common slow speed printing application permits sufficient time for the circuit capacitances (thermal masses) to discharge and repeatedly start from an "ambient" level, as the repetition rate increases there will come a time when sufficient discharge time is not allowed and the starting voltage at the initialization of each cycle will become greater. The effect of this on the element temperature is illustrated in FIG. 8. However it is possible to compensate for this insufficient decay time by introducing a voltage source of opposite polarity and sufficient magnitude ($V_{TE}$, representing an active thermoelectric heat pump) that the charge (heat) is removed from $C_{HEATSINK}$ and $C_{SUBSTRATE}$ so that $C_{ELEMENT}$ is charged principally from $I_{BURN}$.

Figure 7:
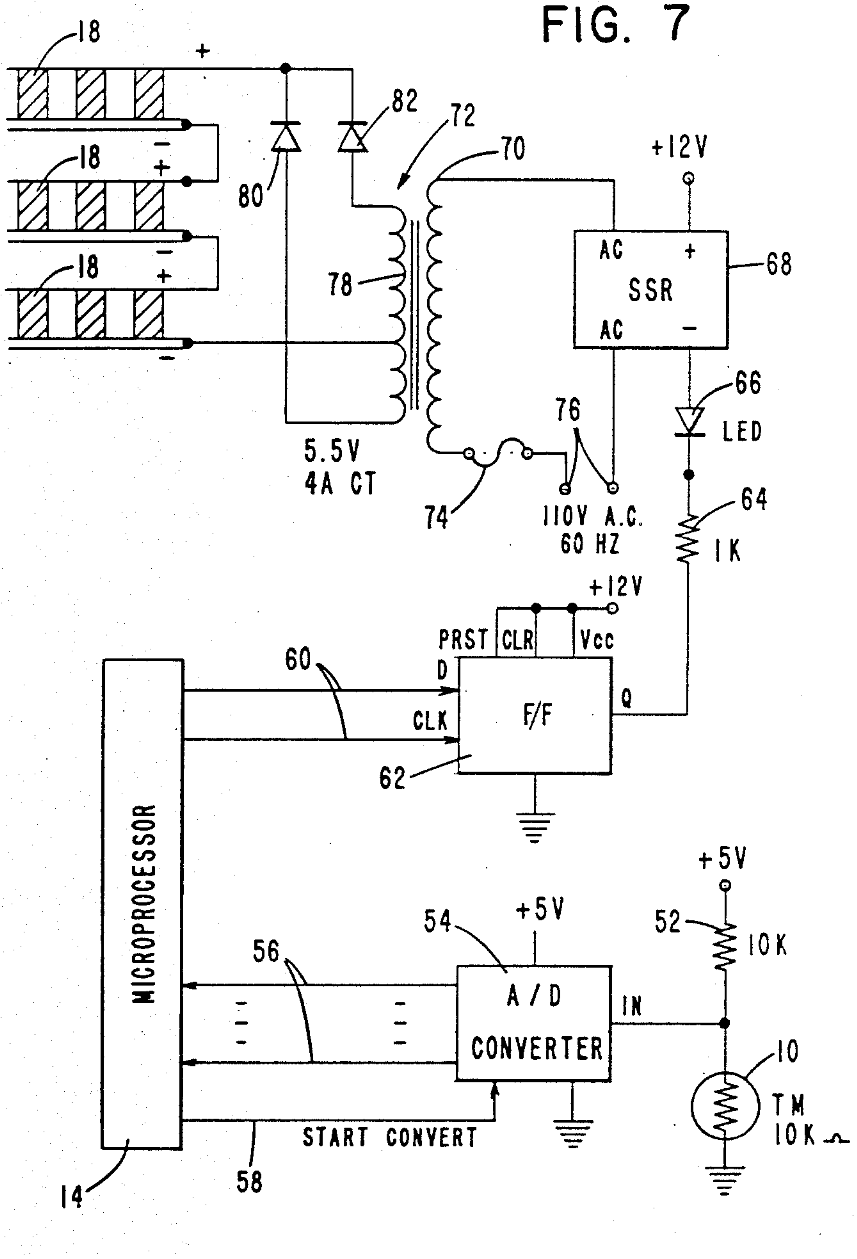
FIG. 7 is a diagram of a control circuit for operation of the thermal printhead temperature control system of the present invention.

FIG. 7 illustrates one system control circuit implementation which can be derived from the block diagram of FIG. 1. The temperature sensor 10 may suitably be implemented as a 10,000-ohm thermistor which is placed in a circuit which also includes a 10,000-ohm fixed resistor 52 and which extends from a plus 5-volt source of potential to a ground connection. From a point between the thermistor 10 and the resistor 52, a path extends to an analog-to-digital converter 54, which may be of type ADC0809, manufactured by National Semiconductor Corp. of Santa Clara, Calif. The analog-to-digital converter 54 has appropriate terminals connected to +5 volts and ground, and also has outputs 56 coupled to the microprocessor 14, which may be of type 8051, manufactured by Intel Corporation, Santa Clara, Calif., for providing digital data thereto after said data has been received in analog form from the thermistor 10. A START CONVERT line 58 extends from the microprocessor 14 to the analog-to-digital converter 54, so that the microprocessor 14 can periodically monitor the thermistor 10, to determine when the established 30 degree C reference temperature has been exceeded. The 30 degree C reference temperature may be stored in a suitable memory location in the microprocessor for comparison with the temperature sensed by the thermistor 10.

When information is conveyed from the thermistor 10 to the microprocessor 14 via the analog-to-digital converter 54 that the reference temperature has been exceeded, the microprocessor transmits signals over lines 60 to cause the output of a flip-flop 62 to be switched to a "low" level. The flip flop 62 may be of type 74C74, manufactured by Texas Instruments, Dallas, Tex., and has appropriate terminals connected to a source of plus 12 volts and to ground. The output of the flip flop 62 is connected to a 1000-ohm resistor 64 and an LED 66, which is included for display purposes, to the negative input of a solid state relay 68, which may be of type IR S218, manufactured by International Rectifier, of El Segundo, Calif. The positive terminal of the relay 68 is connected to a source of plus 12-volt potential, and the two AC terminals of said relay are connected to the operating circuit of the secondary coil 70 of a transformer 72. Said operating circuit also contains a fuse 74 and terminals 76 which are applied to a source of 110 volts AC, 60 Hz.

Two diodes 80 and 82 rectify the low voltage AC waveform which appears on the secondary coil 78 of the transformer 72 when the solid state relay 68 is activated by the flip flop 62. This rectification produces a "constant" 5.5 volts potential at a current of 4 amperes, which is applied across the three thermoelectric heat pumps 18 to cause them to operate to cool the thermal printhead 12. When sufficient cooling has taken place, the next monitoring of the thermistor 10 will show that the temperature has dropped below 30 degrees C, and the microprocessor 14 will then trigger the flip flop 62 to turn off the solid state relay 68, and thereby halt operation of the thermoelectric heat pumps 18.

Other more sophisticated circuits may be considered for the control of the thermoelectric heat pumps 18, should it be desired to supply only the power necessary to transport the heat from the thermal print head 12 out to the ambient environment. This might take the form of an adjustable voltage regulator along with a chopper pulsed HEXFET electronic switch to regulate the current flow. For the example cited, however, the circuit of FIG. 7 is sufficient to accomplish the needed cooling for the thermal printhead 12.

It would also be possible to use a circuit similar to that of FIG. 7 to heat a thermal printhead if the surrounding ambient air is too cool or if the thermal printhead temperature drops below some specified reference zone. Another branch of the same circuit could be employed to cool the thermal printhead should its temperature rise beyond an established point. It will be recalled that heating of the thermal printhead through the thermoelectric heat pumps merely requires a polarity reversal of the drive circuit which is used for cooling of the thermal printhead by the thermoelectric heat pump.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A method of controlling the temperature of a thermal print head which includes a heat sink and which comprises part of a printer comprising the steps of:

insulating the heat sink of the thermal print head from the rest of the printer;

determining a maximum reference temperature at which the thermal print head can operate without erroneous printing;

measuring the temperature of the thermal print head during operation; and cooling the heat sink of the thermal print head whenever the temperature of said print head rises above said maximum reference temperature.

2. The method of claim 1 in which said cooling is accomplished by means of one thermoelectric heat pump.

3. The method of claim 1 in which said cooling is accomplished by means of a plurality of thermoelectric heat pumps.

4. A method of controlling the temperature of a thermal print head which includes a heat sink and which comprises part of a printer comprising the steps of:

insulating the heat sink of the thermal print head from the rest of the printer;

sensing the temperature of the thermal print head;

converting the sensed temperature from an analog to a digital value;

comparing the digitized sensed temperature with a reference temperature:

triggering a storage device when the sensed temperature exceeds the reference temperature to cause said storage device to retain this information;

activating a switch means when said storage device is in said triggered condition;

operating cooling means in response to the activation of said switch means to cause cooling of the heat sink of said thermal print head;

continuing to sense, convert and compare the temperature of the thermal print head with said reference temperature; and retriggering said storage device to deactivate said switch means and thereby terminate operation of said cooling means when the sensed temperature drops below the reference temperature.

5. The method of claim 4 in which said cooling means is a thermoelectric heat pump means.

6. The method of claim 5 in which the step of operating the thermoelectric heat pump means includes the transforming of a voltage associated with said switching means to a different voltage associated with said thermoelectric heat pump means.

7. The method of claim 4, also including a step of providing an indication of the status of the operation of the cooling means, said indication being controlled by the condition of the storage means.

8. Thermal printing apparatus comprising, in combination:

thermal print head means including a ceramic layer and a plurality of resistive elements thereon and capable, when heated to a sufficient degree, of producing markings on a record member;

a heat sink in contact with said thermal print head means;

a thermal print head frame located in proximity to said heat sink;

sensing means located in said heat sink for measuring the temperature of the thermal print heat means;

cooling means positioned in an aperture in said thermal print head frame in contact with said heat sink, and capable of cooling said thermal print head means;

means for periodically comparing the temperature of the sensing means with a reference temperature; and means for operating said cooling means when the measured temperature exceeds the reference temperature, and for terminating the operation of said cooling means when the measured temperature is reduced to the reference temperature or below.

9. The thermal printing apparatus of claim 8 in which said cooling means comprises thermoelectric heat pump means.

10. The thermal printing apparatus of claim 9 in which said thermoelectric heat pump means comprises a plurality of thermoelectric heat pumps.

11. The thermal printing apparatus of claim 8, also including indicator means to indicate whether or not said cooling means is operating.

12. The thermal printing apparatus of claim 8, also including insulating means positioned between the heat sink and the thermal print head frame.

13. The thermal printing apparatus of claim 12, in which the insulating means is a polyurethane sheet.

14. Thermal printing apparatus comprising, in combination:

thermal print head means including a ceramic layer and a plurality of resistive elements thereon, and capable, when heated to a sufficient degree, of producing markings on a record member;

a heat sink in contact with said thermal print head means;

a thermal print head frame in proximity to said heat sink;

sensing means located in said heat sink for measuring the temperature of the thermal print head means;

analog-to-digital conversion means for converting said measured temperature to a digital value;

processor means including memory means in which a reference temperature is stored and also including means for periodically comparing said digital temperature value with said reference temperature;

cooling means positioned in an aperture in said thermal print head frame in contact with said heat sink, and capable of cooling said thermal print head means; and means for operating said cooling means when the measured temperature exceeds the reference temperature, and for terminating the operation of said means when the measured temperature is reduced to the reference temperature or below.

15. The thermal printing apparatus of claim 14 in which the cooling means comprises thermoelectric heat pump means.

16. The thermal printing apparatus of claim 15 in which said thermoelectric heat pump means comprises a plurality of thermoelectric heat pumps.

17. The thermal printing apparatus of claim 14 in which the means for operating said cooling means includes flip flop means controlled by said processor means for storing an operating condition which is dependent upon the comparison of the digital temperature value with the reference temperature.

18. The thermal printing apparatus of claim 17 in which the means for operating said cooling means also includes relay means controlled by said flip flop means for operating said cooling means.

19. The thermal printing apparatus of claim 18, in which the means for operating said cooling means also includes transformer means, the primary of which is controlled by said relay means, and the secondary of which supplies power to said cooling means.

20. The thermal printing apparatus of claim 14, also including indicator means to indicate whether or not said cooling means is operating.

21. The thermal printing apparatus of claim 14, also including insulating means positioned between the heat sink and the thermal print head frame.

22. The thermal printing apparatus of claim 21, in which the insulating means is a polyurethane sheet.

* * * * *